3,713,786
EVAPORATIVE SULFURIC ACID RECOVERY FROM SULFURIC ACIDS CONTAINING SULFATES
Charles H. Umstead, Palmerton, Pa., assignor to The New Jersey Zinc Company, Bethlehem, Pa.
Filed Dec. 6, 1971, Ser. No. 205,252
Int. Cl. B01d 1/18; C01b 17/90
U.S. Cl. 23—307                                     22 Claims

ABSTRACT OF THE DISCLOSURE

Sulfuric acid in concentrated form is recovered from dilute, waste sulfuric acid liquors containing metal sulfates, such as those resulting from the leaching of mineral values from ores and the like or from the cleaning of metals such as iron and steel. Separation of the sulfate salts in substantially dry form is effected by total evaporation of the water and of the sulfuric acid; condensation of these vapors is controlled so that the resulting acid is of increased concentration.

BACKGROUND OF THE INVENTION

(1) Field of the invention

This invention relates to an improved apparatus and improved processes for the regeneration of sulfuric acid solutions for example those resulting from the production of titanium dioxide pigment by the sulfate process and from the liquors resulting from the cleaning and pickling of iron and steel.

In the sulfate process for the production of titanium dioxide pigment, titaniferous ores or slags are digested with 90–95% sulfuric acid. After hydrolysis of the digestion "black liquor" and separation of the titanium dioxide hydrate produced therein, large quantities of a liquid stream containing about 20% free sulfuric acid and 10–20% by weight of dissolved salts remain. Depending upon the type and origin of the ore or slag, the dissolved salts include iron, aluminum, magnesium, calcium, and titanium sulfates plus minor quantities of the sulfates of vanadium, chromium and manganese.

In excess of 1.5 million tons of sulfuric acid are used each year in the manufacture of titanium dioxide pigment. Almost all of this acid reports in the 20% acid stream. Another 1 million tons of sulfuric acid are used each year in the cleaning of metals, from which a somewhat similar waste acid solution results. The dilution inherent in each of these processes makes for a waste acid stream totaling in excess of 10 million tons per year.

The disopsal of these acid liquor has long been a problem; a solution becomes increasingly urgent since these wastes, if not treated, present a threat to the environment.

(2) Description of the prior art

It is well known that the solubility of ferrous sulfate decreases as the concentration of sulfuric acid increases. Efforts have been made to use this knowledge to advantage in processes for the regeneration of waste sulfuric acid solutions. In such processes, the first step is generally to increase the sulfuric acid concentration from the 20% usually present in these waste solutions to about 50–60%; heating to effect removal of water, for example, by a flame submerged within the liquor is most common. Other methods for removing this water are known including indirect heating my media, such as steam, supplied to jackets, tubes, coils, etc., plus various types of evaporators including single, multiple-effect and vacuum concentrators. Increase in concentration of the acid may also be effected by fortification with higher strength acid. Unfortunately, concentration by whatever means has generally resulted in the precipitation of the sulfates in the form of fine particles very difficult to separate from the liquors. Seeding, aging for substantial periods of time and cooling, singly and in combination, have been proposed as means for increasing the size of these particles and improving separability. In any case, the sulfate solids occlude appreciable quantities of the acid liquors resulting not only in sulfuric acid losses but also in further difficulties in handling and disposal. Further concentration to the 90–95% sulfuric acid content required for recycling in the sulfate process for producing titanium dioxide pigment, results in similar difficulties.

Reuse in the digestion of titaniferous ores and slags for the production of titanium pigment is beset with an addition complication in that the presence of very small amounts of certain elements, e.g., chromium, vanadium, managanese, etc., is known to seriously effect the color of the titanium dioxide pigment product. Any of these elements in the ores or slags which go into solution during the digestion, eventually are found in the waste acid solution from which they are not readily separable. Continued recycling of such liquors through recovery of concentrated sulfuric acid results in an increasing content of these deleterious elements.

Processes to recover sulfuric acid through the steps of concentration and separation of the solids as outlined above, have failed to gain commercial acceptance. It has also been proposed that these waste acids and their contained salts be totally thermally decomposed to produce sulfur dioxide gas which then must be reconverted to sulfuric acid in a contact sulfuric acid plant. The removal of the objectional cations by treatment with strong acid ion exchange resins and by electromembrane processes have also been suggested. None of these offer a real solution to this problem.

SUMMARY OF THE INVENTION

In accordance with the present invention, processes and apparatus are provided for the recovery of sulfuric acid from dilute sulfuric acid waste liquors containing salts, said recovered acid being entirely suitable for use in the sulfate process for the production of titanium dioxide pigment. Separation of the contained salts in substantially dry form is effected by substantially total evaporation of the water and sulfuric acid, without decomposition of the latter. The vapors are condensed under conditions controlled so that all of the sulfuric acid and less than all of the water vapors are condensed thereby producing an acid product of concentration greater than that fed to the process.

DETAILED DESCRIPTION

Figure 1:
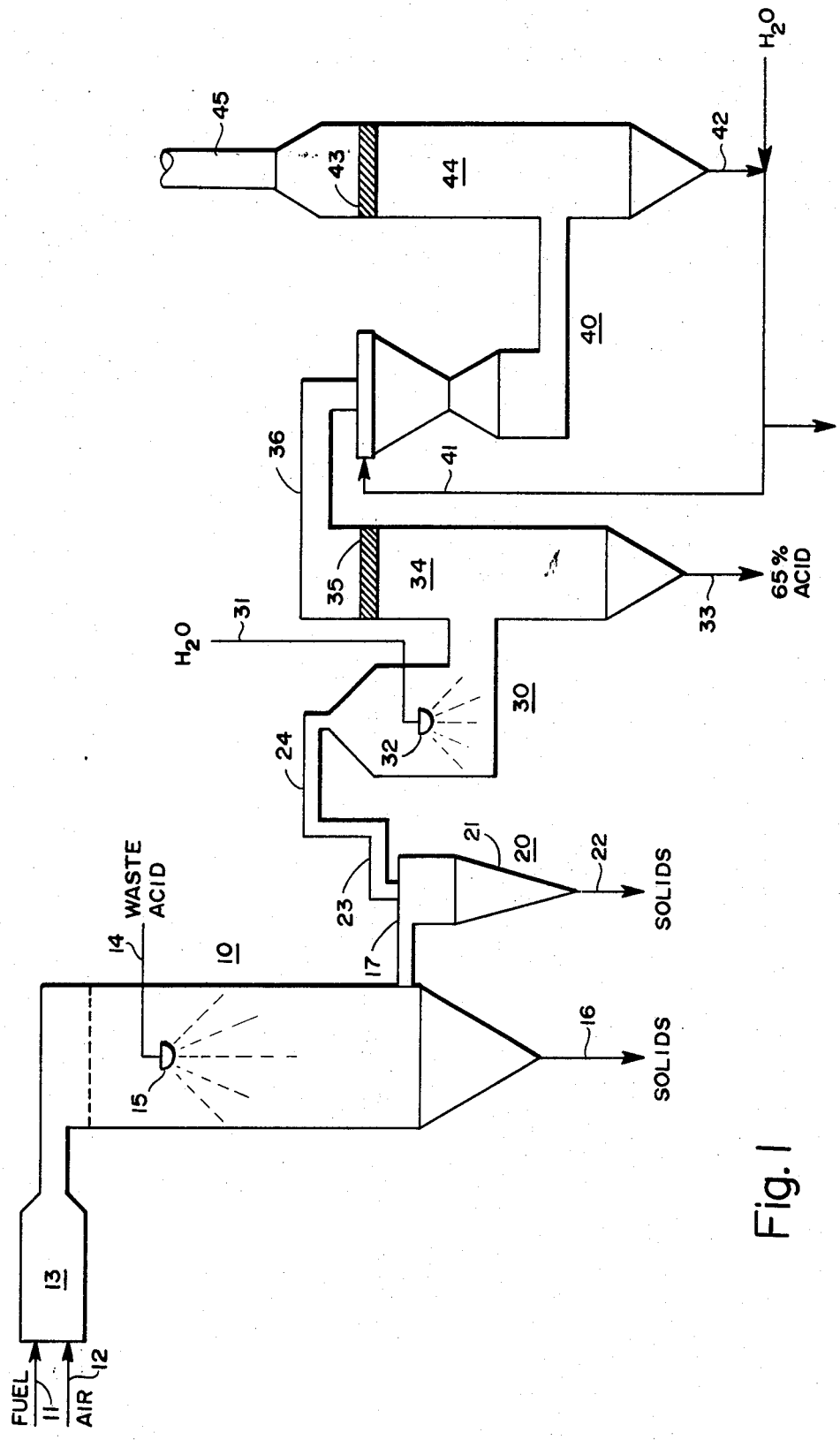
FIG. 1 is a schematic diagram of the apparatus and of a process of the present invention.

In general, this invention relates to apparatus and methods for the regeneration of sulfuric acid solutions used in leaching mineral values from ores and the like or in cleaning and descaling metals such as iron and steel. The leaching or cleaning operations result in the accumulation of sulfate salts in these acidic liquors. In accordance with this invention, the waste liquors are substantially totally evaporated to effect separation of the salts in substantially dry form. The acid vapors are condensed under conditions such that concentration of the sulfuric acid is increased.

Waste acid liquors, for example, those resulting from the production of titanium dioxide pigment via the sulfate process containing about 18–20% sulfuric acid plus sulfate salts totaling about 10–20% by weight, can be fed directly to apparatus for carrying forth the process. These liquors, if desired, can be subjected to a preconcentration treatment, for example, by the well-known submerged combustion process in which removal of water is effected by combustion of a fuel directly within the liquor; preconcentration to 50–60% sulfuric acid may be desirable. The degree to which the waste liquors may be preconcentrated depends to a great extent upon the resulting physical characteristics and the equipment employed to disintegrate the stream in the ensuing evaporation step.

In one embodiment of this invention, the feed liquor, either "as is" waste acid or as a preconcentrate, is directed into a tower or like chamber preferably in a finely divided stage and is subjected therein to an atmosphere conducive to the vaporization not only of the water content of the liquor but also of the sulfuric acid. As is well known in the spray drying art, the liquor can be introduced through a spray nozzle or other disintegrating device for providing the same in finely divided state in the interior of the chamber. A gaseous evaporating medium, also, is introduced into the chamber. The specific form of the spray evaporating chamber may be of various configurations and does not constitute a part of this invention, except that it functions so that evaporation of the water and the sulfuric acid is as complete as possible to ensure collection of the sulfate salts in a dispersed and substantially dry form. The conditions in the evaporating chamber should be such that decomposition of the sulfuric acid is avoided. These conditions can be fulfilled by prompt and intimate contact between the finely divided liquor generally at or somewhat above ambient temperature and the gaseous evaporating medium, generally the hot gaseous products resulting from combustion of a fuel, such that a final temperature for the mixture, not exceeding about 350°–400° C., is achieved within a very short period of time. Higher temperatures are known to be conducive to the decomposition of sulfuric acid and should be avoided; such decomposition results in the loss of acid and possible eventual discharge of sulfur dioxide to the atmosphere.

The vapors emanating from the evaporator may contain a residual amount of solid sulfate salts entrained therein; a device such as a cyclone separator maintained at a temperature such that condensation of any of the vapor is prevented, can be employed. The vapors are subjected to a condensation controlled so that substantially all of the sulfuric acid and less than substantially all of the water vapor is condensed; the acid condensation product thereby has a sulfuric acid concentration greater than that of the waste liquor fed to the evaporator.

The condensation can be affected in a conventional shell and tube heat exchanger or the vapor can be cooled by passage through a Venturi scrubber or spray tower fed with water, the evaporation of which cools the vapors. Sulfuric acid can also be used in the latter in which case the acid can after cooling be continuously recirculated. The concentration of sulfuric acid in the condensation product depends on the amount of cooling and to some extent upon the acid concentration of the feed liquor. For example, with a feed liquor containing about 20% sulfuric acid, cooling so that the vapor emanating from the condensation train has a temperature of about 150° C., will result in a condensation product having a sulfuric acid concentration of about 65–70%. The condensation can also be effected in several stages, each at a progressively lower temperature. In this manner, the condensation in the first stages may, for example, be conducted at temperatures in excess of 150° C., resulting in condensation products therefrom having a sulfuric acid concentration greater than that indicated previously. In the later stages, temperatures at or below 150° C. can be maintained, the specific temperatures being governed by liquor-vapor equilibria considerations. The condensates from the later stages can be used as coolant in the earlier stages.

The acid products obtained by the apparatus and processes of this invention can be processed to higher acid concentrations, if necessary, by fortification with concentrated acid or by fractional distillation techniques, both well known to the art.

Referring to FIG. 1, wherein is shown spray evaporator 10. Fuel and air are fed through lines 11 and 12 respectively to burner 13. Waste acid liquor enters the spray evaporator through line 14 which terminates in a spray device 15, to provide for the introduction of the liquor in a finely divided state.

In order to avoid decomposition of the sulfuric acid, it is essential that intimate contact between the hot gases from burner 13 at a temperature of about 600–1000° C. and the finely divided liquor issuing from spray device 15 at or somewhat above ambient temperature, be effected as promptly as possible. The temperature of the mixture of water and sulfuric acid vapors, and combustion gases leaving the spray evaporator 10 through outlet 17, should not exceed about 350° C.

The spray evaporator 10 has two outlets therefrom; an outlet 16, at the base, which is coupled to a closed container to receive the discharge of dry sulfate solids and an outlet 17, at the side, through which the vapors and gases are transferred to cyclone separator 21. Any solids which remain in the gas stream exiting the spray evaporator, are caused to drop down the conical sides 21 of the separator to the bottom outlet 22 and thence discharged to a sealed receptacle (not shown).

Substantially solids-free gases and vapors exit the cyclone separator through conduit 24 and enter the condensation unit 30 wherein they are contacted and cooled by evaporation of liquid water introduced via line 31 through spray device 32. The temperature in the condensation unit is controlled such that substantially all of the sulfuric acid vapor and less than all of the water vapor are condensed. With a feed liquor containing about 20% sulfuric acid, a temperature of about 150° C. in condensation unit 30, will result in a product having a sulfuric acid concentration of about 65–70%. Control of the temperature is effected by the amount of water evaporated.

Vapor-liquid separation chamber 34 provides for disengagement of liquid droplets from the non-condensable gases, i.e., principally those from the combustion in burner 13, and for coalescence of the liquid droplets. The condensation product is collected in the base and discharged through outlet 33 to a storage tank (not shown).

Mist eliminator 35 which may consist of commercially available demisting pads, functions to impede escape of the fine droplets of sulfuric acid and to allow for their collection with the product acid. The non-condensable gases pass through the mist eliminator 35 via a conduit 36 to a Venturi scrubber 40.

Venturi scrubber 40 is provided to assure that any last traces of sulfuric acid are removed from the gas stream before discharge through the stack 45. Water is recirculated from outlet 42 of the vapor-liquid separator 44 through line 41 to the scrubber. Another mist eliminator 43 insures that the discharged gases will consist of water vapor and the non-condensables of combustion.

Referring to FIG. 2, there is set forth various combinations of process steps, all in accordance with this invention.

Figure 2A:
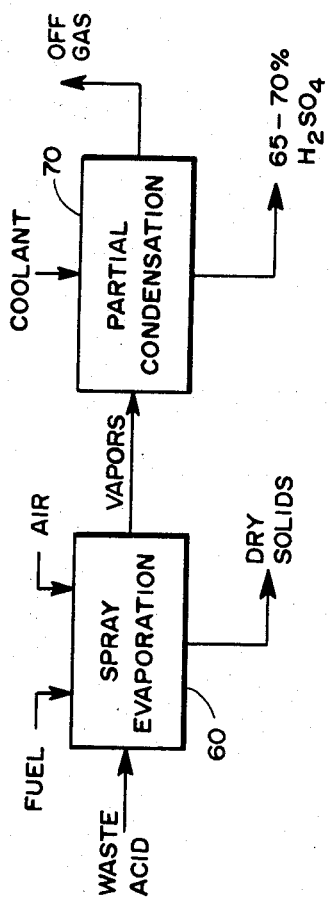
FIGS. 2a, 2b and 2c present block diagrams of processes in accordance with other embodiments of this invention, some of the individual process steps being common to all, e.g., spray evaporation.

As shown in FIG. 2A, the process consists essentially of at least two steps; one, spray evaporation 60 to effect separation of the dissolved sulfate salts and two, condensation 70 of the sulfuric acid and water vapors in such a manner as to obtain a desired concentration of sulfuric acid.

Figure 2B:
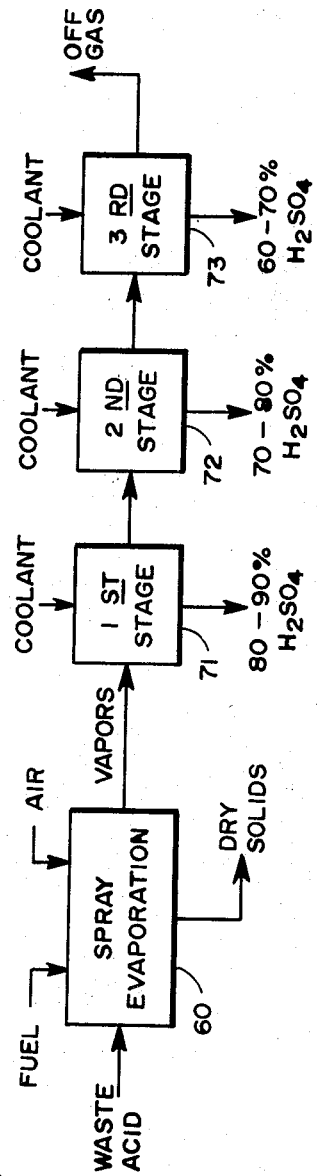

Assume as waste acid solution comprising 20% sulfuric acid, 10% dissolved sulfate salts and the remainder water, is spray evaporated (at 60) wherein the 10% salts are separated yielding a gaseous stream including the 20% sulfuric acid and 70% water vapor from the waste acid solution plus the products of combustion of the fuel required to supply the heat required for evaporation. These vapors are condensed under conditions such that ideally, 93% sulfuric is obtained. This condensation can be obtained by a technique known as partial condensation (at 70), i.e., in a single stage, substantially all of the higher boiling sulfuric acid is condensed and less than all of the water; the remaining uncondensed water vapor can be vented to the atmosphere. A technique known as differential partial condensation may also be employed; this involves partial condensation carried out in a series of stages, each at a succeedingly lower temperature. In FIG. 2B, an example of a three-stage differential partial condensation is shown at 71, 72, and 73. Higher temperatures in the earlier stages result in the condensation of lesser amounts of the water vapor with consequent higher concentrations of sulfuric acid in the product. This technique may avoid fractional distillation or fortification of at least a part of the sulfuric acid product in cases where high, i.e., 90% or greater, acid concentrations are desired. The condensate collected in the later stages will perforce be of lower strength and may be recycled to the earlier stages of condensation through use as coolant whereby evaporation of the water may be accomplished.

Figure 2C:
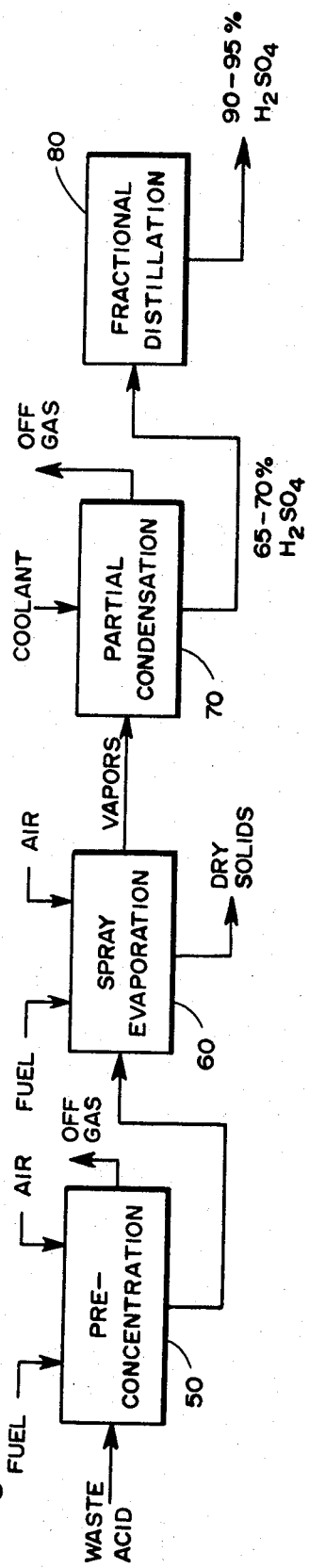

A preconcentration step to effect elimination of some of the water may be applied before the spray evaporation and a final fractional distillation may follow the condensation, whether partial or differential partial. FIG. 2C shows a process including preconcentration 50, spray evaporation 60, partial condensation 70, and fractional distillation 80.

In summary this invention offers the following advantages over prior processes:

(1) Maximum use of direct heat transfer between the waste acid solution and the hot combustion gases.
(2) Avoidance of the decomposition of sulfuric acid by prompt and intimate contact between the hot gasses and the finely divided waste acid solution.
(3) Removal of substantially all of the dissolved sulfate salts in substantially dry form resulting from separation from a gas-solid rather than a liquid-solid mixture.
(4) Acid product of a range in desired concentrations through use of partial or differential partial condensation.
(5) An acid product perfectly amenable to further concentration by fractional distillation techniques.
(6) A sulfuric acid product pure enough for reuse in the sulfate process for the production of titanium dioxide pigment.

Various alternatives will readily become apparent to those skilled in the art. For example, the spray evaporation may be accomplished in a bed of sulfate salts maintained in a fluid state by the introduction of the hot combustion gases therein. Other alternatives may suggest themselves, it being noted that in essence, with this invention, sulfuric acid and water are evaporated from a mixture of this acid, water and sulfate salts without decomposition of the acid. The vapors are condensed to yield a substantially salt-free acid for use in the sulfate process for the production of titanium dioxide pigment.

I claim:

1. A process for recovery of sulfuric acid from a water diluted sulfuric acid solution principally of metal sulfates comprising the steps of
   (a) effecting separation of said sulfates in substantially dry form from said dilute sulfuric acid solution by substantially total evaporation of the water and sulfuric acid therefrom without decomposition of the latter, thereby producing vapors of water and sulfuric acid; and
   (b) controlling condensation of said vapors from (a) such that substantially all of the sulfuric acid and less than all of the water are condensed thereby producing a sulfuric acid product substantially free of metal sulfates and a sulfuric acid concentration greater than that of the dilute acid solution fed to the process.

2. A process according to claim 1 wherein condensation of the vapors of sulfuric acid and water is effected at a temperature of about 150° C. whereby substantially all of the sulfuric acid and less than all of the water is condensed to the liquid state.

3. A process according to claim 1 wherein prior to any processing thereof, the water diluted sulfuric acid containing sulfates of metals, is subjected to a treatment to effect removal of water therefrom in the form of a vapor.

4. A process according to claim 1 wherein the condensation product is fractionally distilled to produce a sulfuric acid of at least about 93% concentration.

5. A process according to claim 1 wherein evaporation of the water and sulfuric acid is effected in a chamber by prompt and intimate contact between the dilute acid in a finely divided state at about ambient temperature, and the hot gaseous products resulting from combustion of a fuel.

6. A process according to claim 5 wherein condensation of the vapors of sulfuric acid and water is effected at a temperature of about 150° C. whereby substantially all of the sulfuric acid and less than all of the water is condensed to the liquid state.

7. A process according to claim 5 wherein prior to any processing thereof, the water diluted sulfuric acid containing sulfates of metals, is subjected to a treatment to effect removal of water therefrom in the form of a vapor.

8. A process according to claim 5 wherein the condensation product is fractionally distilled to produce a sulfuric acid of at least about 93% concentration.

9. A process according to claim 5 wherein decomposition of sulfuric acid in (a) is avoided by limiting the temperature of the vapors of sulfuric acid and water to about 350° C.

13. A process according to claim 9 wherein condensation of the vapors of sulfuric acid and water is effected at a temperature of about 150° C. whereby substantially all of the sulfuric acid and less than all of the water is condensed to the liquid state.

11. A process according to claim 9 wherein prior to any processing thereof, the water diluted sulfuric acid containing sulfates of metals, is subjected to a treatment to effect removal of water therefrom in the form of a vapor.

12. A process according to claim 9 wherein the condensation product is fractionally distilled to produce a sulfuric acid of at least about 93% concentration.

13. A process according to claim 9 wherein condensation of the vapors of sulfuric acid and water is effected in a plurality of stages, the temperature in each succeeding stage being somewhat lower than that in the stage immediately preceding whereby the sulfuric acid content of the condensation products will vary directly with the condensation temperature.

14. A process according to claim 13 wherein prior to any processing thereof, the water diluted sulfuric acid containing sulfates of metals, is subjected to a treatment to effect removal of water therefrom in the form of a vapor.

15. A process according to claim 13 wherein the condensation product is fractionally distilled to produce a sulfuric acid of at least about 93% concentration.

16. A process according to claim 13 wherein condensation of the vapors of sulfuric acid and water is effected in three stages, the first at about 175° C., the second at about 150° C., and the third at about 125° C.

17. A process according to claim 16 wherein prior to any processing thereof, the water diluted sulfuric acid containing sulfates of metals, is subjected to a treatment to effect removal of water therefrom in the form of a vapor.

18. A process according to claim 16 wherein the condensation product is fractionally distilled to produce a sulfuric acid of at least about 93% concentration.

19. A process according to claim 17 wherein the condensation product is fractionally distilled to produce a sulfuric acid of at least about 93% concentration.

20. A pollution controlled process for treating a waste acid solution containing essentially water, sulfuric acid, and metal salts so as to recover sulfuric acid without decomposition thereof and the metal salts in substantially dry form, comprising the steps of
   (a) evaporating the waste acid solution under conditions to avoid decomposition of the sulfuric acid therein, thereby producing vapors of water and sulfuric acid and yielding metals salts in substantially dry form; and
   (b) controlling condensation of said vapors such that substantially all of the sulfuric acid and less than all of the water are condensed thereby producing a sulfuric acid product substantially free of metals salts and of a sulfuric acid concentration greater than that of the dilute acid solution fed to the process.

21. The process as recited in claim 20 wherein step (a) includes spray evaporation of the waste acid solution.

22. The process as recited in claim 20 wherein step (b) occurs at a temperature exceeding the boiling point of water but below the boiling point of sulfuric acid.

References Cited

UNITED STATES PATENTS

| | | | |
|---|---|---|---|
| 856,048 | 6/1907 | Gaillard | 203—12 |
| 1,048,247 | 12/1912 | Weeks | 23—172 |
| 2,373,359 | 4/1945 | Voogd et al. | 23—172 |
| 2,389,070 | 11/1945 | Merriam et al. | 23—172 |
| 2,832,810 | 4/1958 | Smolin | 23—172 |
| 3,211,538 | 10/1965 | Gross et al. | 23—300 |
| 3,294,650 | 12/1966 | Manteufel | 203—87 |

FOREIGN PATENTS

| | | |
|---|---|---|
| 237,637 | 1/1964 | Netherlands. |

NORMAN YUDKOFF, Primary Examiner

R. T. FOSTER, Assistant Examiner

U.S. Cl. X.R.

23—305; 159—16; 203—12, 87; 423—531, 558